(12) United States Patent
Johnson

(10) Patent No.: US 6,735,292 B1
(45) Date of Patent: May 11, 2004

(54) METHOD AND SYSTEM FOR PRIORITY CALL PROCESSING

(75) Inventor: William J. Johnson, Flower Mound, TX (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/466,018

(22) Filed: Dec. 17, 1999

(51) Int. Cl.[7] .............................................. H04M 3/42
(52) U.S. Cl. ........................... 379/201.01; 379/211.02
(58) Field of Search ...................... 379/201.01–201.05, 379/207.02, 207.11–207.15, 211.01, 211.02, 215.01

(56) References Cited

U.S. PATENT DOCUMENTS

| | | | | |
|---|---|---|---|---|
| 4,277,649 A | * | 7/1981 | Sheinbein | 379/197 |
| 5,329,578 A | * | 7/1994 | Brennan et al. | 379/196 |
| 5,625,680 A | * | 4/1997 | Foladare et al. | 379/199 |
| 5,872,841 A | * | 2/1999 | King et al. | 379/205.01 |
| 5,937,050 A | * | 8/1999 | Yue et al. | 379/100.01 |
| 6,018,572 A | * | 1/2000 | Foladare et al. | 379/211.01 |
| 6,160,877 A | * | 12/2000 | Tatchell et al. | 379/197 |

* cited by examiner

Primary Examiner—Ahmad F. Matar
Assistant Examiner—Quynh H. Nguyen

(57) ABSTRACT

A method of and system for providing special call processing based upon called party specified masks and the status of electronic mail, electronic calendar, and voice mail items associated with the called party and a calling party receives a request to set up a call between a calling party number and a called party number. The system determines if the called number is associated with a mask entry that matches the calling number. If so, the system provides special processing of the call based upon the matching mask entry. The mask entry may be specified by digits and or wild card characters. Special processing is specified by a disposition code in the matching mask entry. If the called number is not associated with a mask entry that matches calling number, the system determines if the called party has a call priority setting set to on for at least one of electronic mail, electronic calendar, or voice mail priority processing. If so, the system determines the status of the at least one electronic mail, electronic calendar, and voice mail between the called party and said calling party, and processes the call based upon the status.

20 Claims, 12 Drawing Sheets

METHOD AND SYSTEM FOR PRIORITY CALL PROCESSING

CROSS-REFERENCE TO RELATED APPLICATIONS

The present application is related to application Ser. No. 09/412,269, filed Oct. 5, 1999, titled PRIORITY CALL PRECESSING BASED ON PHONE MAIL MESSAGES, application Ser. No. 09/441,008, filed Nov. 16, 1999, titled METHOD AND SYSTEM FOR PRIORITY CALL PRECESSING BASED UPON ELECTRONIC CALENDAR STATUS, and application Ser. No. 09/466,024, filed Dec. 17, 1999, titled METHOD AND SYSTEM FOR PRIORITY CALL PRECESSING BASED UPON ELECTRONIC MAIL STATUS, the disclosure of each of which is incorporated herein by reference.

BACKGROUND

The present invention relates generally to the field of telephone and electronic office integration, and more particularly to a method of and system for providing priority call processing based upon voice mail, electronic calendar, and electronic mail status of a calling party or a called party.

Current telephone systems, implemented in circuit switched environments, such as the public switched telephone network (PSTN) or private branch exchange (PBX) networks, or in packet switched environments, such Internet protocol (IP) telephony systems, provide many options for enhancing the usefulness of the system to users. For example, voice mail enables users to have their calls answered by an automated system that records a voice message from the calling party if the called party is unavailable or desires not to take the call. Call forwarding allows a user to have calls to their number forwarded to another number. Call forwarding can be combined with voice mail so that a user can have calls forwarded automatically to voice mail. Certain telephone devices include a do not disturb (DND) key that is used to automatically forward calls to voice mail, a secretary, or a message center.

Voice mail and call forwarding thus enable a user not to be disturbed during meetings or during periods when the user wishes to work without being interrupted with telephone calls. However, there are times that a user would like to receive certain priority calls at the same time the user wishes not to be bothered with normal calls. For example, a user may have a meeting scheduled in the recent past or near future with another party and expect a call from that party regarding the meeting. Similarly, the user may have left an important voice mail message for another party and expect a call from that party. Additionally, the user may send a priority or urgent electronic mail item and expect a call from the recipient. Also, the user may simply wish to receive calls from certain callers or classes of callers at any time. In such cases, the user might wish not to receive most calls, but the user would certainly want to speak immediately to a priority party. Currently, the user must either receive all calls, or monitor his or her voice mail box for messages from the other party. If a caller ID display is available, the calling party must be calling from a recognized phone for the called party to be able to recognize the caller ID.

SUMMARY

The present invention provides a method of and system for providing special call processing based upon called party specified masks and the status of electronic mail, electronic calendar, and voice mail items associated with the called party and a calling party. Briefly stated, the system receives a request to set up a call between a calling party number and a called party number. The system determines if the called number is associated with a mask entry that matches the calling number. If so, the system provides special processing of the call based upon the matching mask entry. The mask entry may specified by digits and or wild card characters. Special processing is specified by a disposition code in the matching mask entry.

If the called number is not associated with a mask entry that matches calling number, the system determines if the called party has a call priority setting set to on for at least one of electronic mail, electronic calendar, or voice mail priority processing. If so, the system determines the status of the at least one electronic mail, electronic calendar, and voice mail between the called party and said calling party, and processes the call based upon the status.

DETAILED DESCRIPTION

Figure 1:
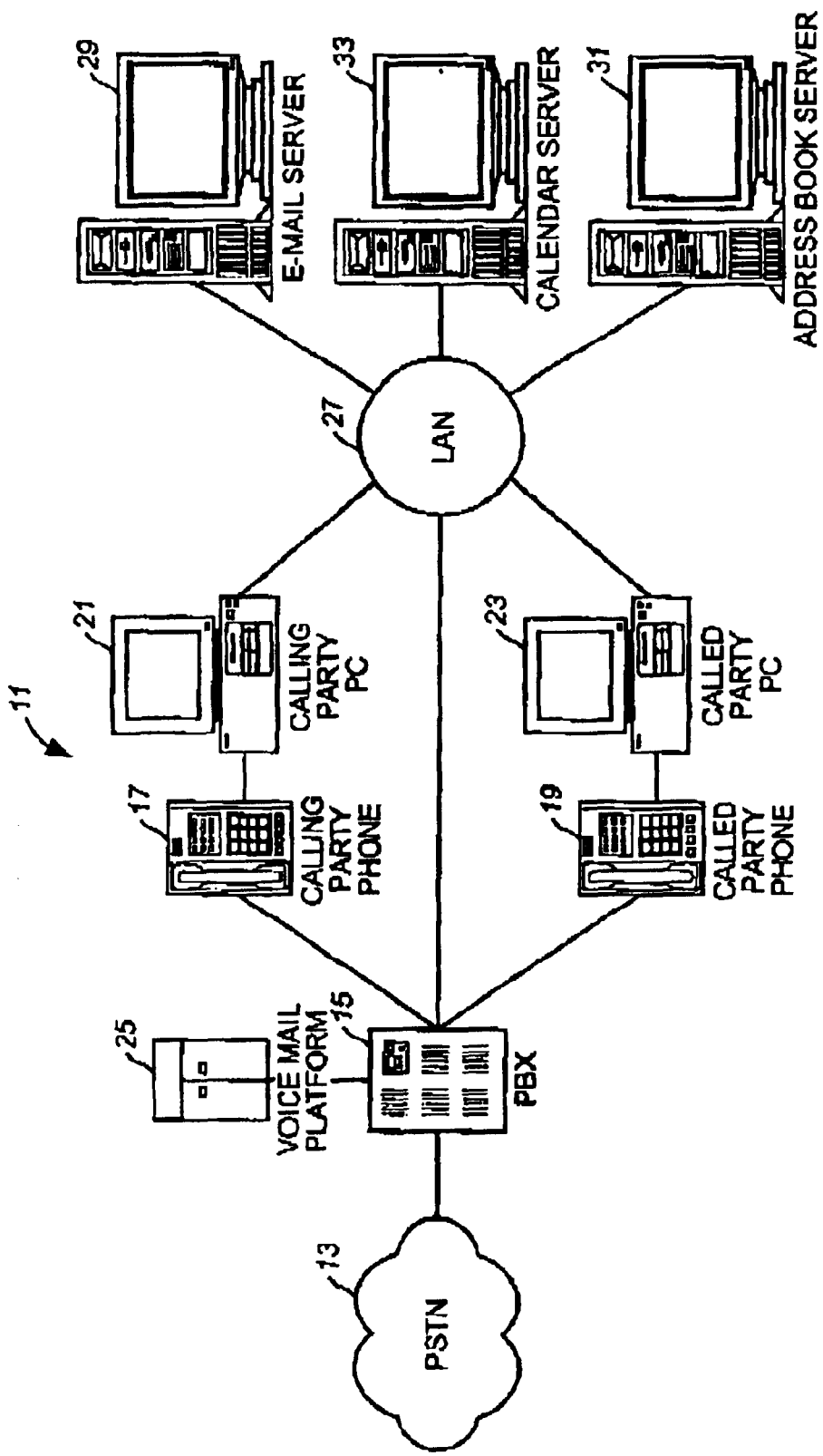
FIG. 1 is a block diagram of a circuit switched network according to the present invention.

Referring now to the drawings, and first to FIG. 1, a circuit switched embodiment of the present invention is designated generally by the numeral 11. System 11 is implemented in a private telephone network that accesses the public switched telephone network (PSTN) 13 through a private branch exchange (PBX) switch 15.

System 11 includes a plurality of telephone devices, including a calling party telephone 17 and a called party telephone 19, connected to PBX 15. Calling party telephone 17 and called party telephone 19 are each associated with a respective user identified by a telephone number or extension. According to the present invention, each user is also associated with a personal computer. Thus, a user of calling party telephone 17 is associated with a calling party personal computer 21. Similarly, user of called party telephone 19 is associated with a called party personal computer 23. Personal computers 21 and 23 for each identified by a network address and an electronic mail address associated with their respective users. According to the present invention, telephones 17 and 19 are interfaced to personal computers 21 and 23, respectively, by a suitable communications interface, such as an M-WAVE (TM) or ROLM244 PC (TM) interface, in a manner well known to those skilled in the art.

The telephone portion of system 11 includes a voice mail platform 25 interfaced to PBX 15, in the manner well known to those skilled in the art. Voice mail platform 25 cooperates with PBX 15 to provide standard voice mail services as well as enhanced integrated telephone and electronic office services according to the present invention. Voice mail platform 25 includes an administrative interface that is preferably implemented in a voice response unit that enables users to administer their voice mail boxes in the manner well known to those skilled in the art. As will be explained in detail hereinafter, the administrative interface of voice mail platform 25 enables users of system 11 to administer call processing according to the present invention.

Personal computers 21 and 23 operate in local area network (LAN) environment 27. LAN 27 is preferably interfaced to a wide area network or to the Internet (neither shown). LAN 27 includes an electronic mail server 29 and an address book server 31. Electronic mail server 29 and address book server 31 provide standard electronic mail and address book services, respectively. Electronic mail server 29 and address book server 31 also provide services according to present invention PBX 17 through suitable application programming interfaces (APIs), as will be explained detail hereinafter.

LAN 27 also includes an electronic calendar server 33. Electronic calendar server 33 provides standard electronic calendar services. Electronic calendar server 33 also provides services according to present invention PBX 15 through suitable application programming interfaces (APIs), as will be explained detail hereinafter.

Figure 2:
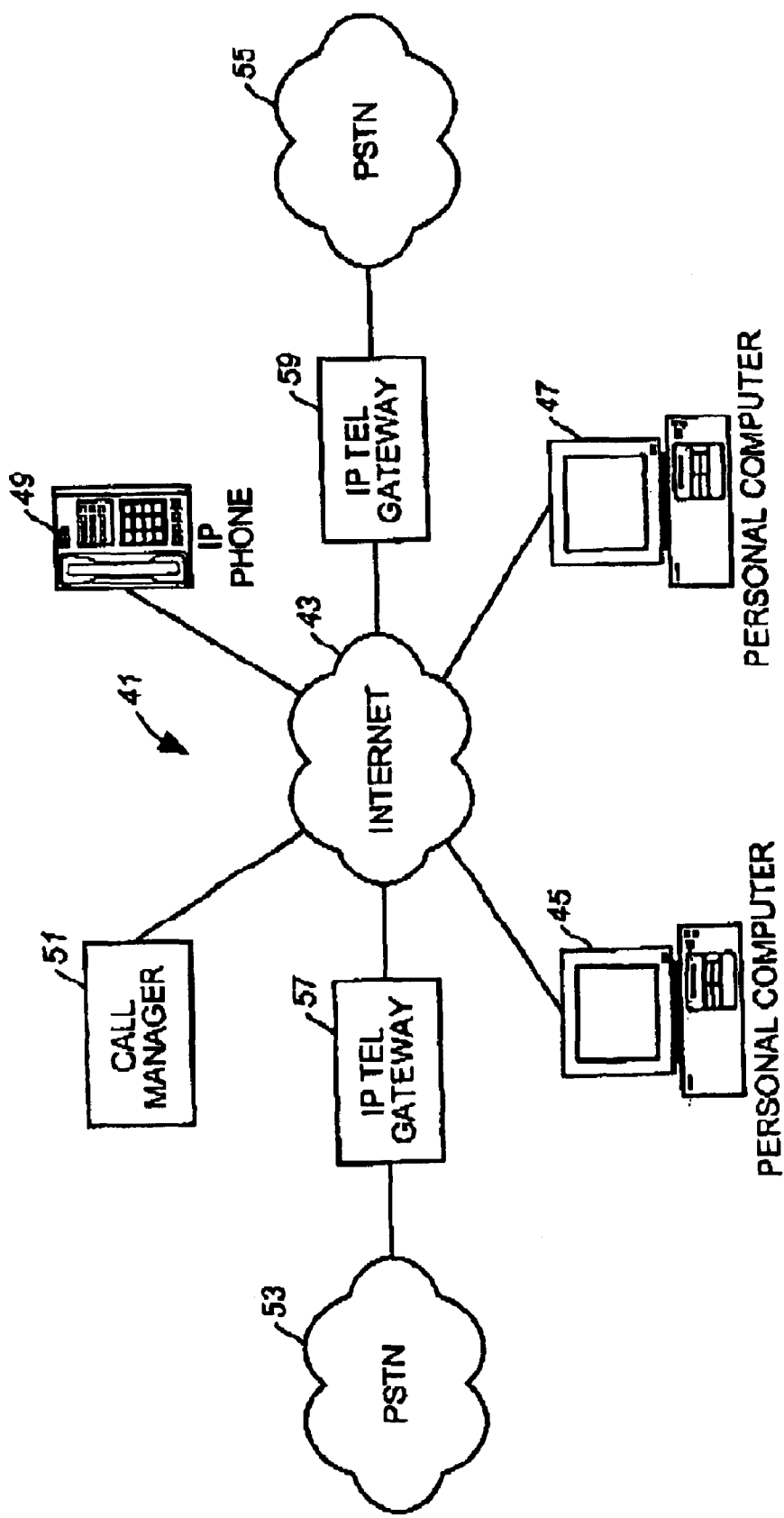
FIG. 2 is a block diagram of a packet switched network according to the present invention.

Referring now to FIG. 2, the present invention also operates in a packet switched telephone system such as an Internet protocol (IP) telephone network 41. In network 41, calls are set up using a signaling protocol such as session initiation protocol (SIP) or H.323 protocol. After setup, calls are transported across Internet 43 using a protocol such as real-time transport protocol (RTP), or the like. Calls can be made between calling parties and called parties across Internet 43 using Web phone enabled personal computers, such as personal computers 45 and 47, and Internet phone devices, such as IP phone 49. A call manager 51, which in the preferred embodiment includes a SIP proxy server, provides services such as local number portability, call forwarding, quality of service, and other services during call setup. Network 41 is interfaced to public switched telephone networks 53 and 55 through IP telephony gateways 57 and 59, respectively. Thus, calls can be made between IP telephony users and PSTN users.

In network 41, such services as voice mail and electronic mail, address book, and calendar are provided by applications that reside on servers or personal computers. Voice mail and electronic mail, calendar, and address book applications may be implemented in a shared client-server environment, or they may be implemented as stand-alone applications on an individual personal computer. In any event, and as will be apparent to the skilled in the art, suitable APIs are provided according to present invention to integrate the voice mail and electronic mail, calendar, and address book functions.

Referring now to FIG. 3, there is shown a flowchart of voice mail administration processing according to one embodiment of the present invention. The embodiment of FIG. 3 finds particular application in the circuit switched environment of FIG. 1. The administration interface of the voice mail system provides a user interface by which the user can interact with the system of the present invention. In FIG. 3, the user connects to the administration interface by telephone, as indicated at block 71. As is well known to those skilled in the art, the user connects to the administration interface by dialing a particular number or extension. The administration interface includes a voice response unit that guides the user through audio menus.

After the user has connected to the administration interface, the system tests, at decision block 73, if the current session is the user's first visit to the administrative interface. If so, the system sets a default delivery lag time, at block 75. The system of the present invention treats, as priority, recently delivered voice mail and electronic mail items. According to the present invention, voice and electronic mail items delivered within the delivery lag time prior to the time that a particular call is initiated are considered recently delivered and deemed to be priority mail items. Also, if the user has not previously visited the administration interface, the system the system sets a default calendar lag time, at block 76.

The system of the present invention, also treats, as priority, calendar events, such as meetings and conferences, involving the calling party and the called party that are scheduled to commence near the time of the call. More specifically, events scheduled later than a particular time prior to the call are deemed to be priority events. The particular time is defined by the calendar lag time. As will be explained, events later than the calendar lag time trigger priority call processing according to the present invention.

If, at decision block 73, the user has previously visited the administration interface, the system clears out obsolete log items according to the relevant delivery lag time, at block 77. According to the present invention, the voice mail and electronic mail logs are maintained. Thus, delivery lag time is managed with respect to the electronic mail and voice mail logs.

After clearing out obsolete log items, at block 77, the user navigates through the interface, as indicated generally at block 78. During navigation, the user is presented with prompts to enter responses to menu items. Typically, a user can exit or quit the administration interface by entering a termination request or by hanging up. If, at decision block 79, the system determines the user has elected to quit, the administrative interface is terminated, at block 81, and FIG. 3 processing ends.

If, at decision block 83, it is determined the user wants to modify voice mail priority handling, the user is prompted to specify ON or OFF for voice mail priority call handling, at block 85. As will be explained in detail hereinafter, if the user specifies ON for priority handling, then calls will receive priority processing according to present invention. If the user specifies OFF, then calls will be processed normally. In similar fashion, if at decision block 87 it is determined the user entered a DTMF signal indicating the user's desire to modify electronic mail priority handling, the user is prompted to specify ON or OFF for electronic mail priority call handling, at block 89. Finally, if at decision block 91 it is determined the user entered the user's desire to modify electronic calendar priority handling, the user is prompted to specify ON or OFF for electronic calendar priority call handling, at block 93.

According to the present invention, a user can modify the e-mail delivery or calendar lag times. If, at decision block 95, it is determined that the user entered the user's desire to modify delivery lag time, the system prompts the user to enter a delivery lag time, at block 97. For example, the user may be prompted to enter digits corresponding to a number of days and/or hours. Similarly, if at decision block 99 it is determined that the user entered the user's desire to modify calendar lag time, the system prompts the user to enter a calendar lag time, at block 101. Again, the user may be prompted to enter digits corresponding to a number of days and/or hours.

In addition to call priority processing based upon voice mail and electronic mail or calendar status, the present invention enables call priority processing based upon the identity of a caller or a class of callers. The present invention allows a user to define a mask table containing caller ID masks that are compared to incoming caller IDs for the purpose of determining priority. Additionally, according to the present invention, the user is able to use wild card characters to broaden the class of caller IDs that will satisfy a predicate. For example, a user may specify the following mask predicates:

56#9 All extensions with 56X9, where X is any digit;
214-* All callers in the 214 area code; or
609-234-* All callers in the 609 area code and the 234 service area.

Moreover, according to the present invention, a user may specify how to process a call that matches a particular mask entry. For example, a user can create a mask entry for his home phone number, thereby making calls from home priority calls. However, the user may wish to limit priority processing of calls from home. In the preferred embodiment, at least the following enumerations of priority handling types are defined:

1=Call invokes call waiting processing if busy, and call rings called number if forwarded and not busy;
2=Call rings called number if not busy, and call forwards to voice mail if busy;
3=Call forwards to voice mail;
4=Call forwards to specified number (Forwarding numbers are then searched in the mask table for corresponding priority processing. Thus, the mask table is continually searched for each forwarded number until a priority setting other than 4 is found or there is no match in the table for the currently searched number.);
5=Call provides busy signal processing to the calling party.

Figure 3A:
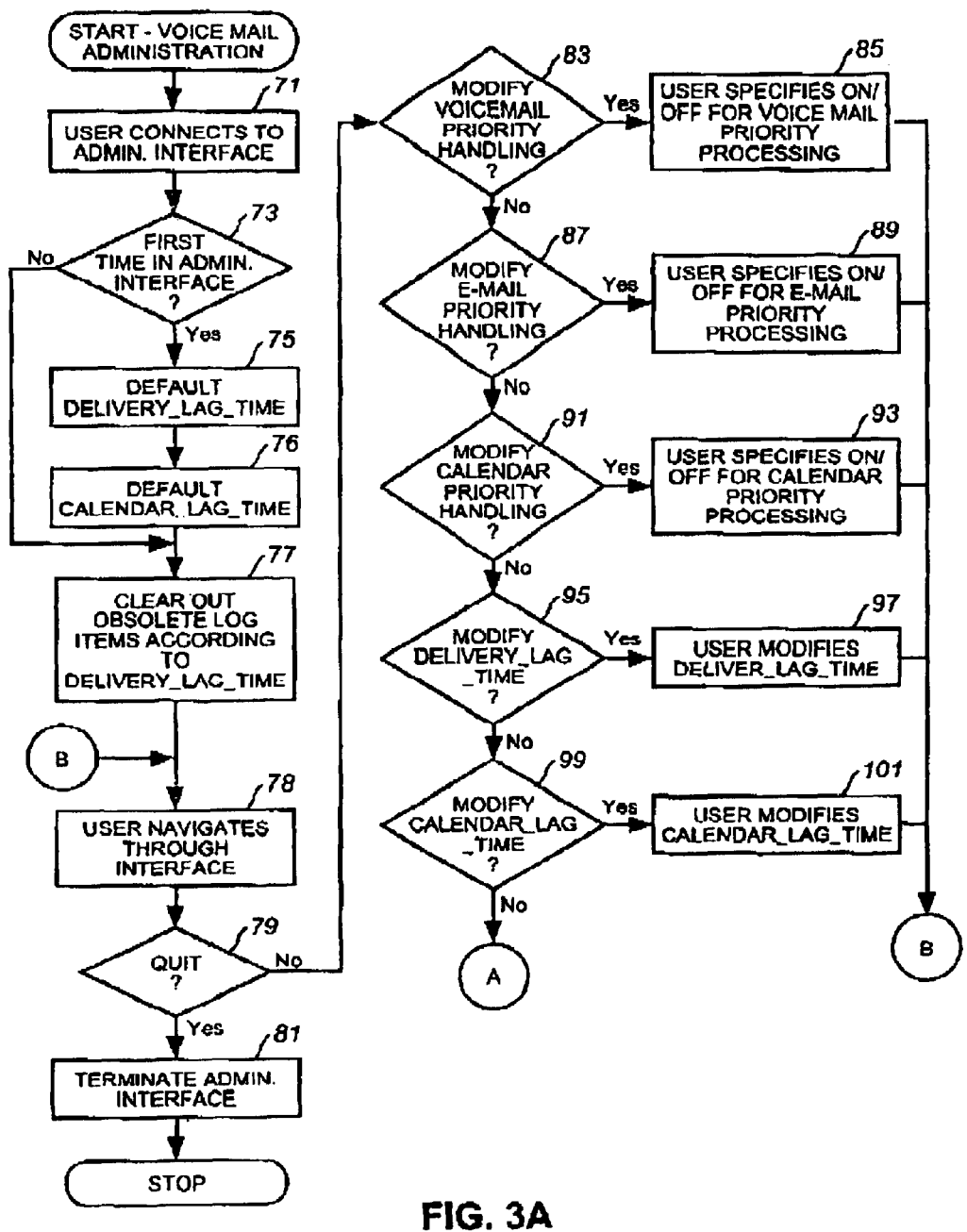
FIGS. 3A and 3B comprise a flowchart of voice mail administration processing according to the present invention.
Figure 3B:
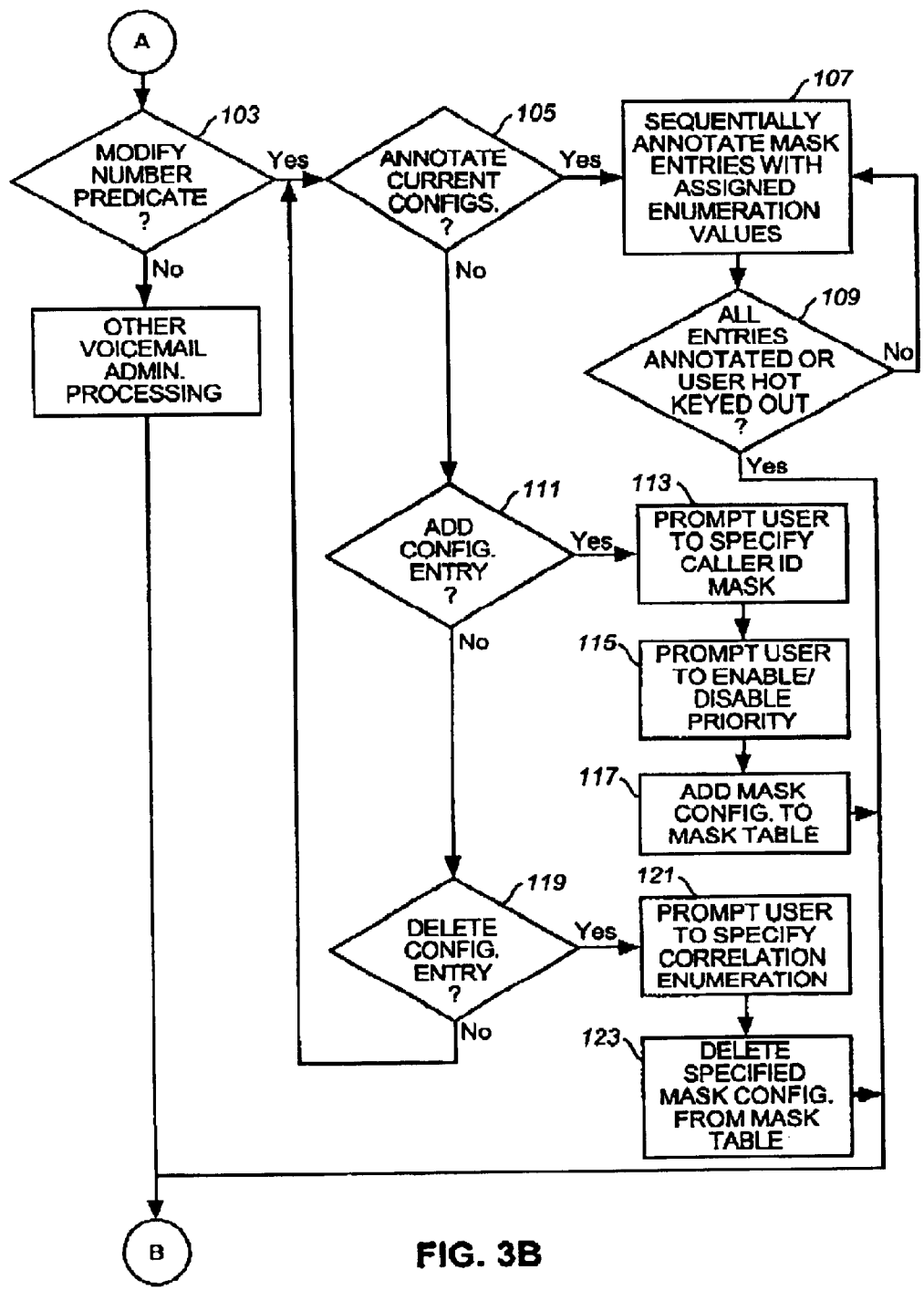

Thus, referring to FIG. 3B, if at decision block 103 it is determined that the user entered DTMF signals indicating the user's desire to modify a number predicate, the user is prompted to annotate current configurations (i.e. mask entries) with a disposition enumeration, add a configuration entry, or delete a configuration entry. If, at decision block 105, it is determined that the user has chosen to annotate current configurations, the user is prompted to sequentially annotate mask entries with assigned enumeration values, at block 107. The system tests, at decision block 109, if all entries have been annotated or the user has exited annotation. If not, processing continues at block 107. If, at decision block 109, all entries have been annotated or the user has exited annotation, then processing continues at block 78 of FIG. 3A.

If, at decision block 111, it is determined that the user has chosen to add a configuration entry, the system prompts the user to specify a caller ID mask at block 113, in the manner described above. Then, the system prompts the user to enable or disable priority at block 115. Then, the system adds the mask configuration to the mask table, at block 117, and processing continues at block 78 of FIG. 3A. If, at decision block 119, it is determined that the user has chosen to delete a configuration entry, the system prompts the user to specify a correlation enumeration, at block 121, and the system deletes the specified mask configuration from the mask table, at block 123. Then, processing continues at block 78 of FIG. 3A. If, as determined at decision block 103, the user does not choose to modify a number predicate, the user may perform other administration functions that are typical in currently existing voice mail systems, as indicated at block 125. FIG. 3 processing continues until the user quits at decision block 79.

Figure 4A:
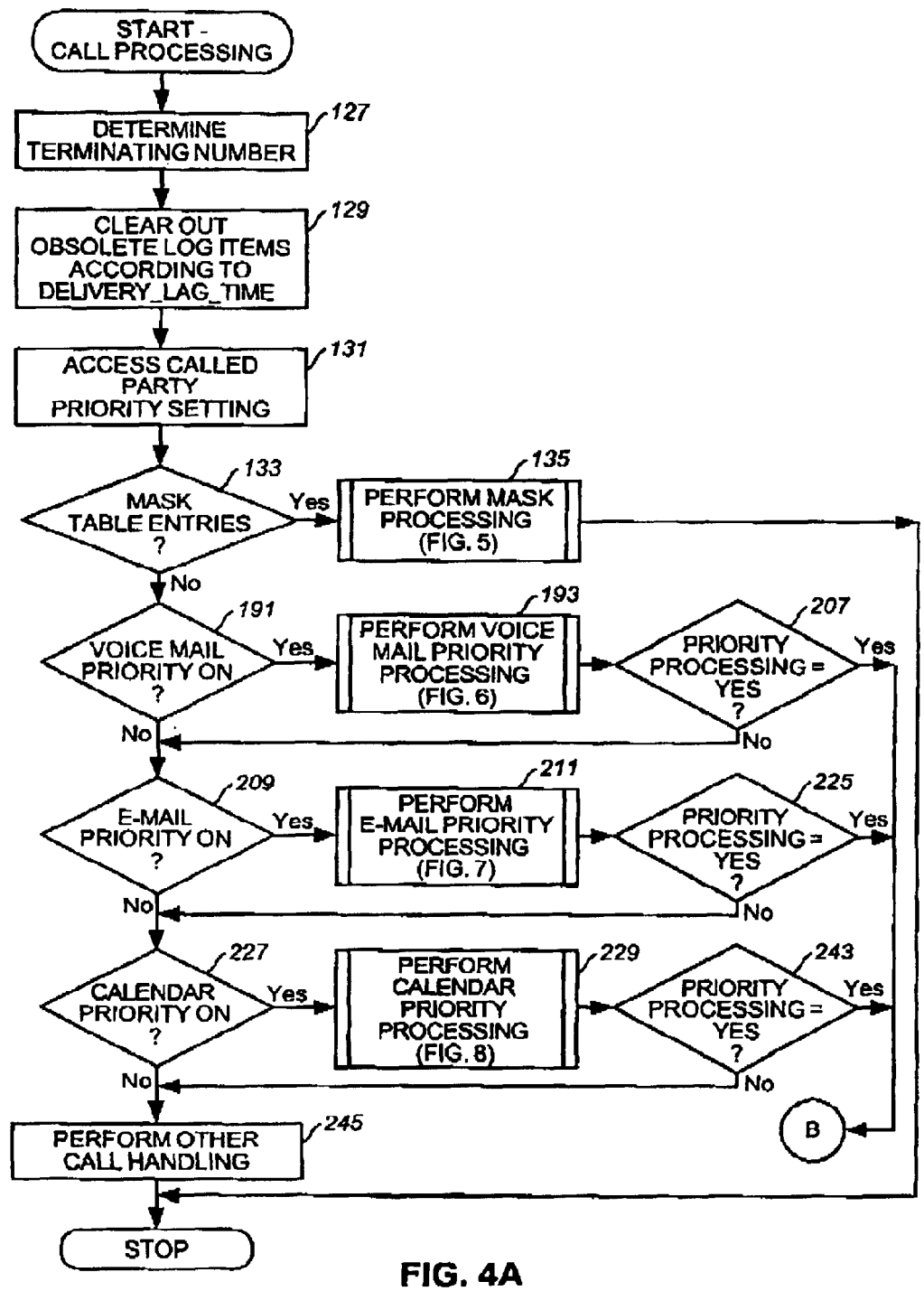
FIGS. 4A and 4B comprise a flowchart of call processing according to the present invention.
Figure 4B:
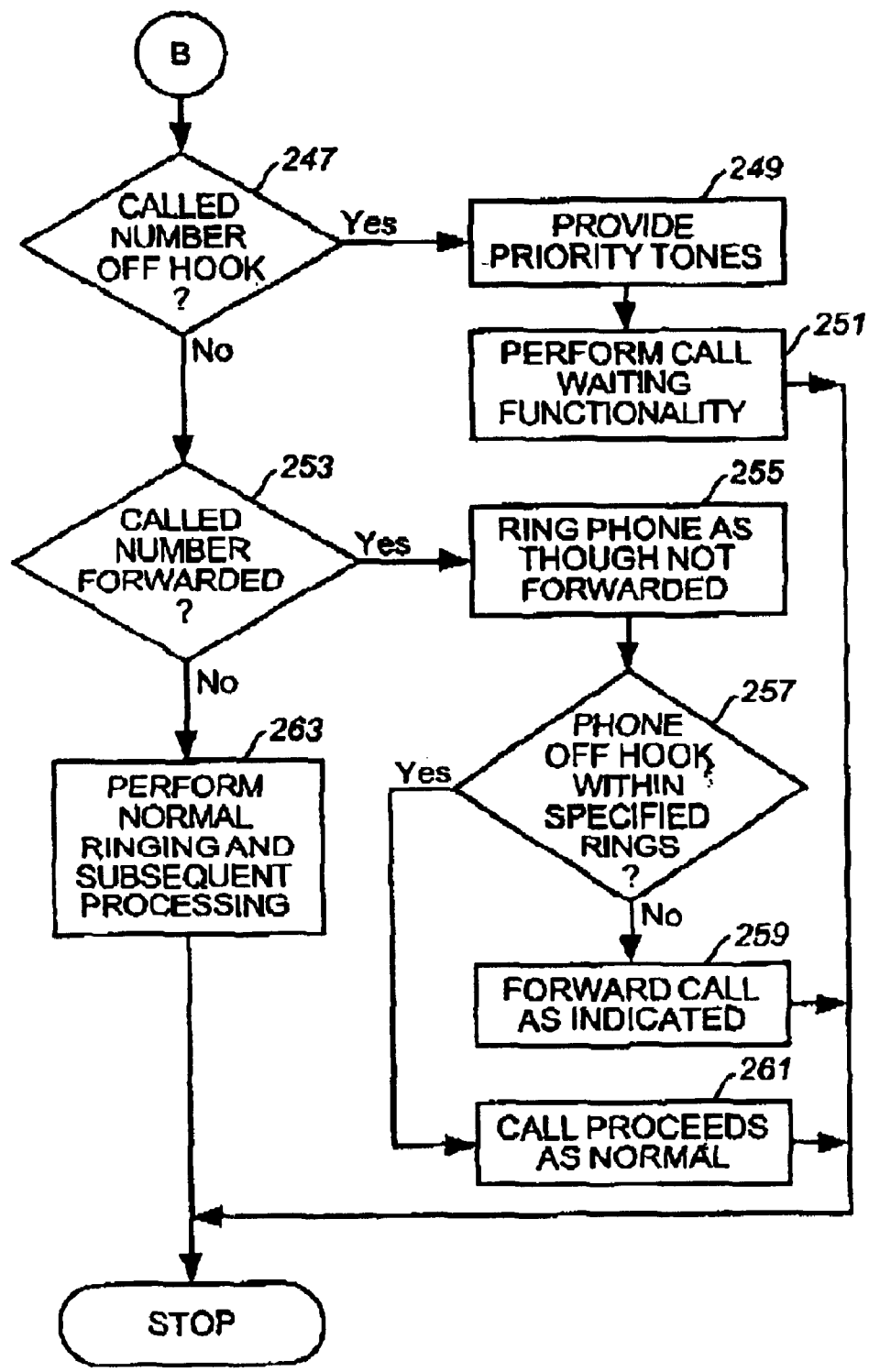

Referring now to FIG. 4, there is shown a flowchart of call processing according to the present invention. The present invention may be implemented in connection with a terminating switch or terminating PBX, in a circuit switched telephony environment, or in connection with a terminating personal computer in an IP telephony environment. When a call is received, the terminating switch, PBX, or personal computer determines the called number, at block 127. According to the present invention, the system clears out obsolete log items according to the delivery lag time, at block 129. Then, the system accesses the call party's priority settings, at block 131. If, at decision block 133, the called party has mask table entries, then the system performs mask processing, as indicated generally at block 135 and shown in detail in FIG. 5.

Referring now to FIG. 5, the system sets the number equal to the called number, at block 137. Then the system access the mask table by number, at block 139. If, at decision block 141, the number is found, the system gets the first or next mask table entry for the number, at block 143. The system tests, at decision block 145, if all mask entries for the number have been searched. If so, the system tests, at decision block 147, if at least one forwarded number has been produced. If so, the system provides normal call forwarding processing, at block 149, and processing returns to FIG. 4A. If, at decision block 147, at least one forwarded number has not been produced, then processing returns to FIG. 4A.

Referring again to decision block 145, if all mask table entries for the number have not been searched, the system tests, at decision block 151, if the caller ID number satisfies the current mask table entry. If not, processing continues at block 143. Processing loops through the mask table entries for the number until either the caller ID number satisfies the current mask table entry, at decision block 151, or all mask table entries for the number have been searched, at decision block 145.

If, at decision block 151, the caller ID number satisfies the current mask entry, then the system determines the type of call processing for the call, based upon the disposition code associated with the mask entry. If, at decision block 153, the current mask entry specifies disposition code 1, which invokes call waiting processing if busy and rings called number if forwarded and not busy, processing proceeds to FIG. 5C. The system tests, at decision block 155, if the called number is forwarded. If so, the system overrides call forwarding and rings the called number a specified number of rings as though not forwarded, at block 157. If, at decision block 159, the called number is answered with the specified number of rings, the call proceeds, as indicated at block 161. If, at decision block 159, the called number is not answered with the specified number of rings, the system forwards the call as originally indicated, at block 161.

Returning to decision block 155, if the called number is not forwarded, then the system tests, at decision block 165, if the called number is busy. If so, the system performs priority call waiting, at block 167. If so, the system provides priority tones, at block 141, and performs call waiting functionality, at block 143. Priority call waiting according to the preferred embodiment includes providing priority tones, which comprise a signal or announcement to the called party that a priority call is waiting. The system performs call waiting functionality so that the called party can answer the priority call. If, at decision block 165, the number is not busy, the call takes place in the usual manner, as indicated at block 169.

Figure 5A:
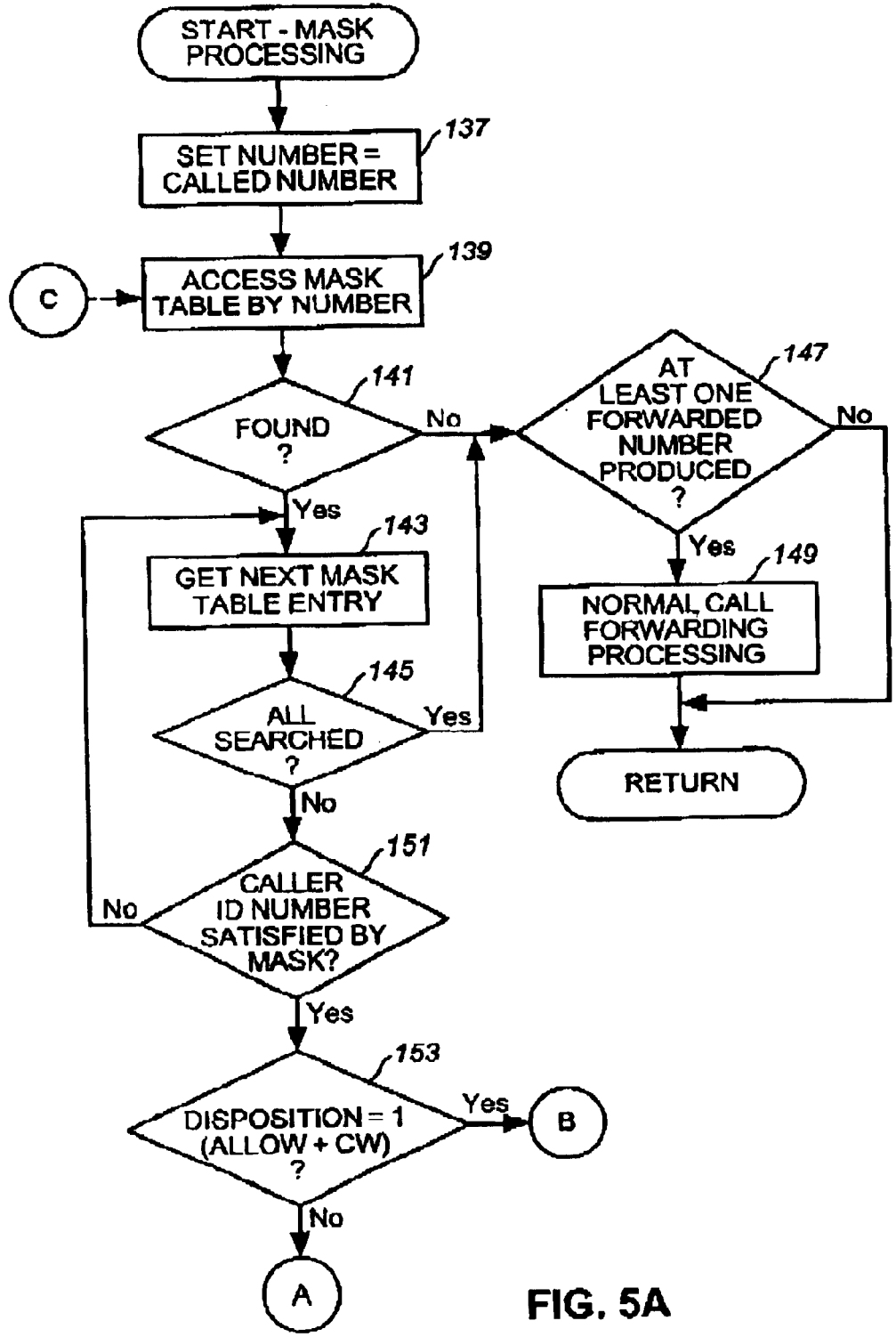
FIGS. 5A, 5B, and 5C comprise a flowchart of mask processing according to the present invention.
Figure 5B:
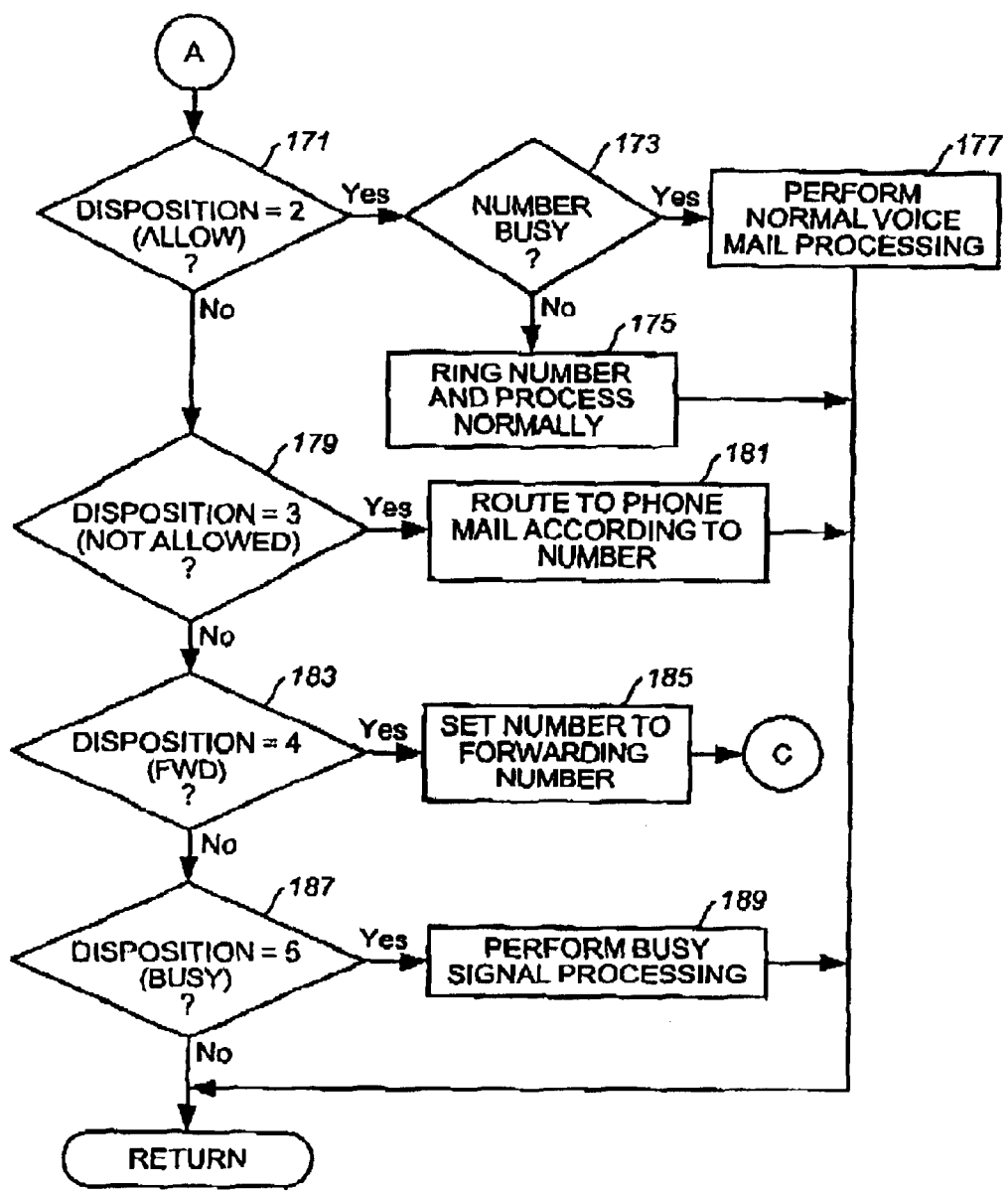
Figure 5C:
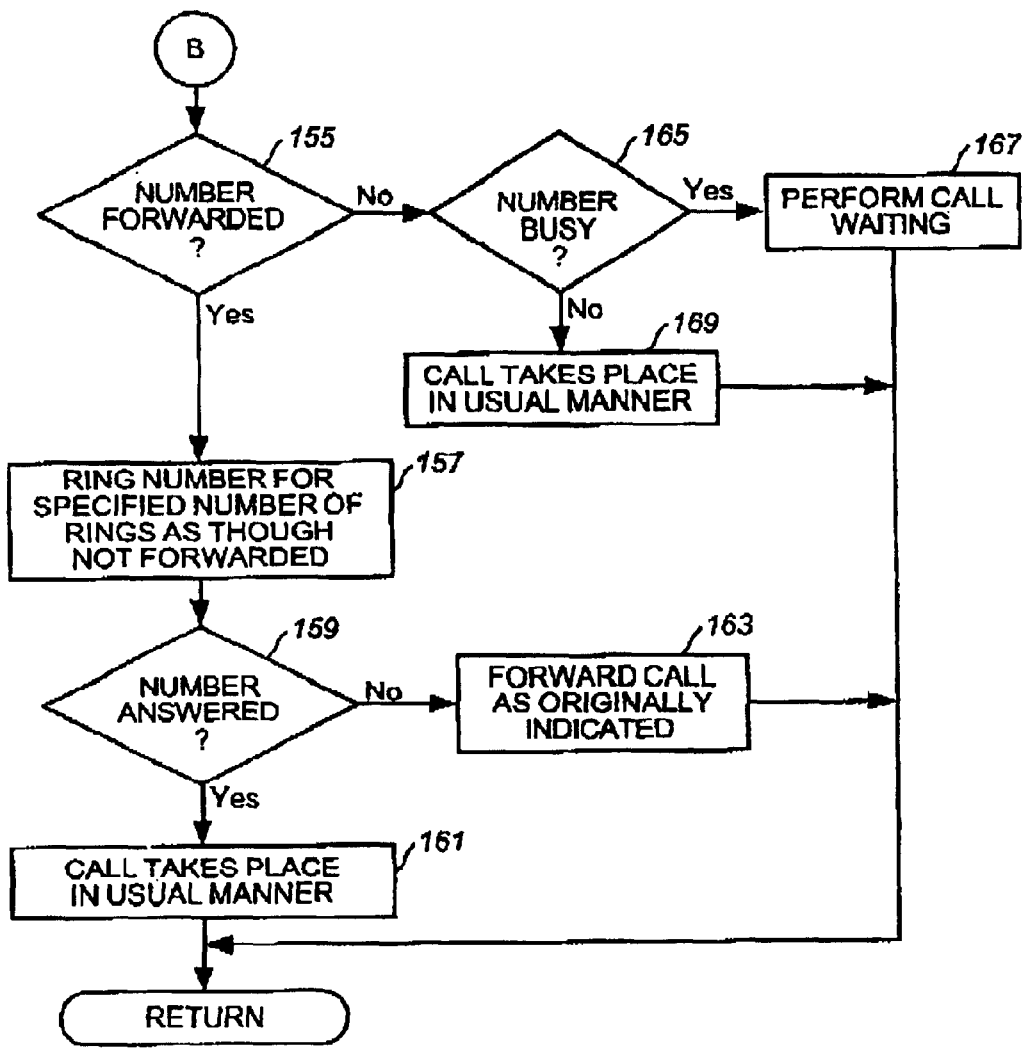

Referring again to decision block 153 of FIG. 5A, the disposition code does not equal 1, then processing proceeds to FIG. 5B. The system tests, decision block 171 if the disposition code to the mask entry is 2. If, at decision block 173, the called number is not busy, then the system rings the called number, at block 175. If the called number is busy, then the system forwards the call to voice mail, at block 177. If, at decision block 179, the disposition code of the mask entry is equal to 3, the system routes the call to voice mail, as indicated block 181, even if the called number is forwarded to an other number or not busy. If, at decision block 183, the disposition code of the mask entry is 4, then the system sets the number (see block 137 of FIG. 5A) equal to the forwarding number, at block 185, and processing proceeds back to block 139 of FIG. 5A. According to the present invention, forwarding numbers are searched in the mask table for corresponding priority processing. Thus, the mask table is continually searched for each forwarded number until at a priority setting other than 4 is found or there is no match in the table for the currently searched number. If, at decision block 187, the disposition code for the mask entry is 5, then the system performs busy signal processing, as indicated at block 189. At the completion of processing according to FIG. 5, processing returns to FIG. 4.

Figure 6:
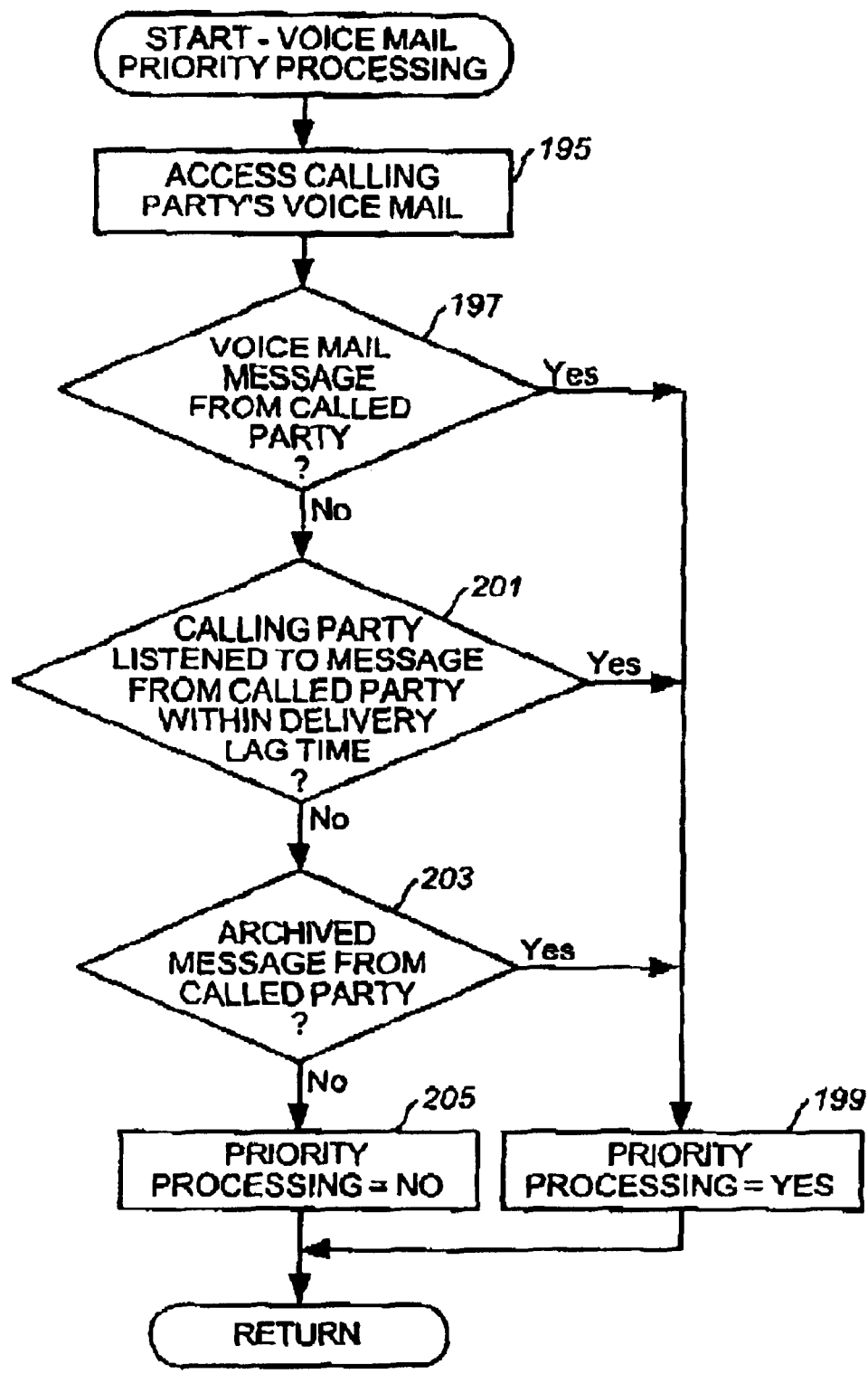
FIG. 6 is a flowchart of voice mail priority processing according to the present invention.

Referring again to FIG. 4A, the system performs priority call processing according to voice mail, electronic mail, and calendar status. It will be recalled that a priority setting is either ON or OFF. If, at decision block 191, the called party's voice mail priority setting is ON, the system performs voice mail priority processing, as indicated generally at block 193 and shown in detail with respect to FIG. 6. Referring to FIG. 6, the system accesses the calling party's voice mail, at block 195. Voice mail priority events according to the present invention generally include voice mail messages left for the calling party by the called party that require a response. The system tests, at decision block 197, if the calling party's voice mail box includes a voice mail message from the called party. If so, priority processing is set to YES, at block 199, and processing returns to FIG. 4A. If not, then the system tests, at decision block 201, if the calling party has listened to a voice mail message from the calling party within the delivery lag time. If so, priority processing is set to YES, at block 199, and processing returns to FIG. 4A. If not, then the system tests, at decision block 203, if the calling party has an archived voice mail message from the calling party. If so, priority processing is set to YES, at block 199, and processing returns to FIG. 4A. If not, priority processing is set to NO at block 205, and processing returns to FIG. 4A.

Referring again to FIG. 4A, the system tests, at decision block 207, if priority processing is set to YES. If so, processing continues to FIG. 4B. If not, the system tests, at decision block 209, if electronic mail priority is set to ON. If so, processing proceeds to FIG. 7, as indicated generally at block 211.

Figure 7:
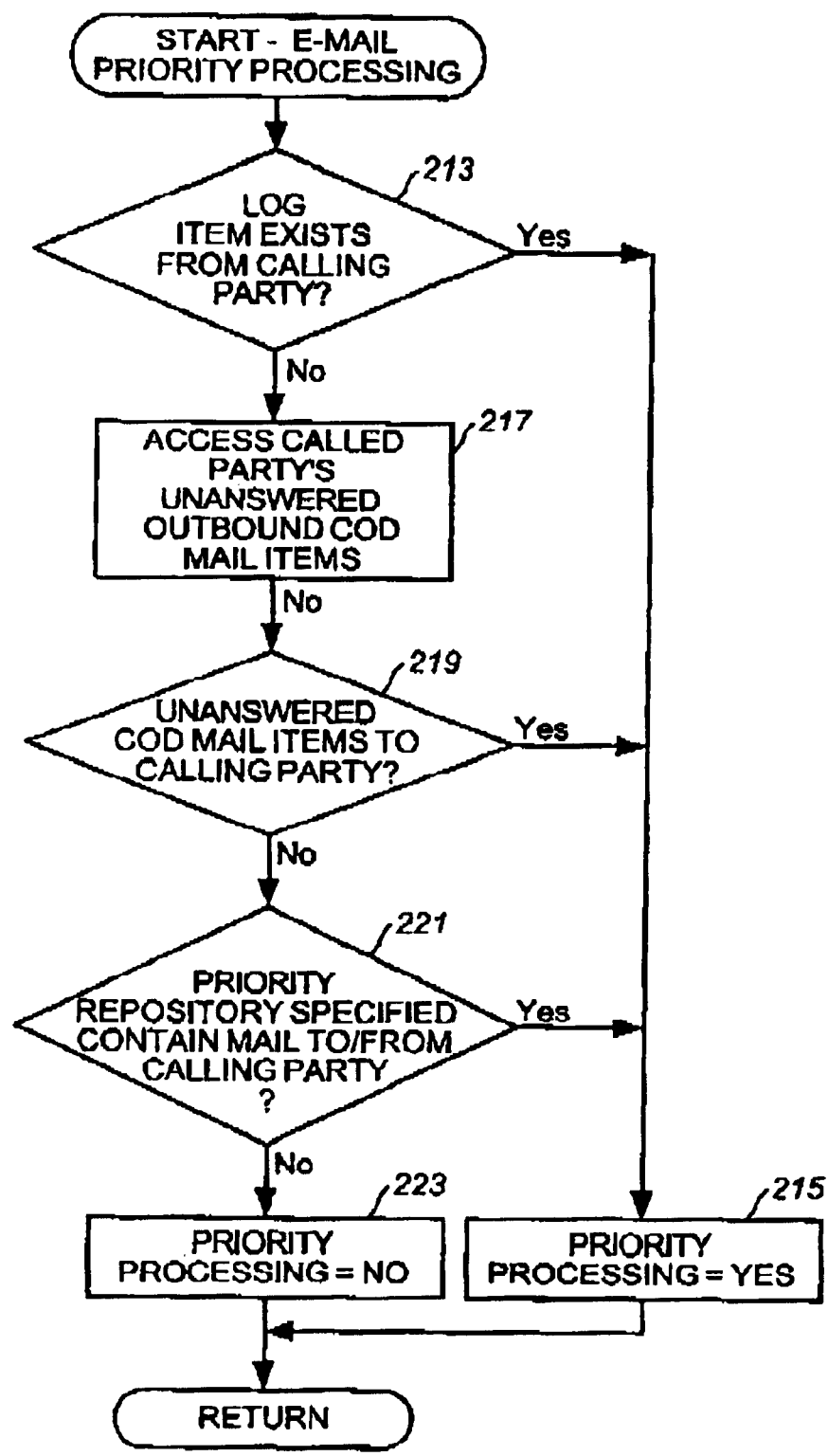
FIG. 7 is a flowchart of electronic mail priority processing according to the present invention.

Referring now to FIG. 7, there is shown a flowchart of call processing based upon electronic mail status between the calling party and the called party according to the present invention. The system tests, at decision block 213, if a log item exists for calling party, the system sets priority processing to YES, at block 215, and processing returns to FIG. 4A. A log item exits if the called party has answered a confirm on delivery (COD) electronic mail item from the called party within the delivery lag time. If, at decision block 213, a log item does not exist from the calling party, then the system accesses the called party's unanswered outbound COD mail items, at block 217. Then, the system tests, at decision block 219, if there are any unanswered COD electronic mail items from the called party to the calling party. If so, the system set priority processing to YES, at block 215, and processing returns to FIG. 4A. If, at decision block 219, there are no unanswered COD items, then the system accesses the called party's priority repository or repositories and tests, at decision block 221, if the repository contains any electronic mail items to or from the calling party. A priority repository is a folder or the like into which a user places priority electronic mail items. If so, the system sets priority processing to YES, at block 215, and processing returns to FIG. 4A. If not, the system sets priority processing to NO, at block 223, and processing returns to FIG. 4A.

Referring again to FIG. 4A, the system tests, at decision block 225, if priority processing is set to YES. If so, processing continues to FIG. 4B. If not, the system tests, at decision block 227, if electronic calendar priority is set to ON. If so, processing proceeds to FIG. 8, as indicated generally at block 229.

Figure 8:
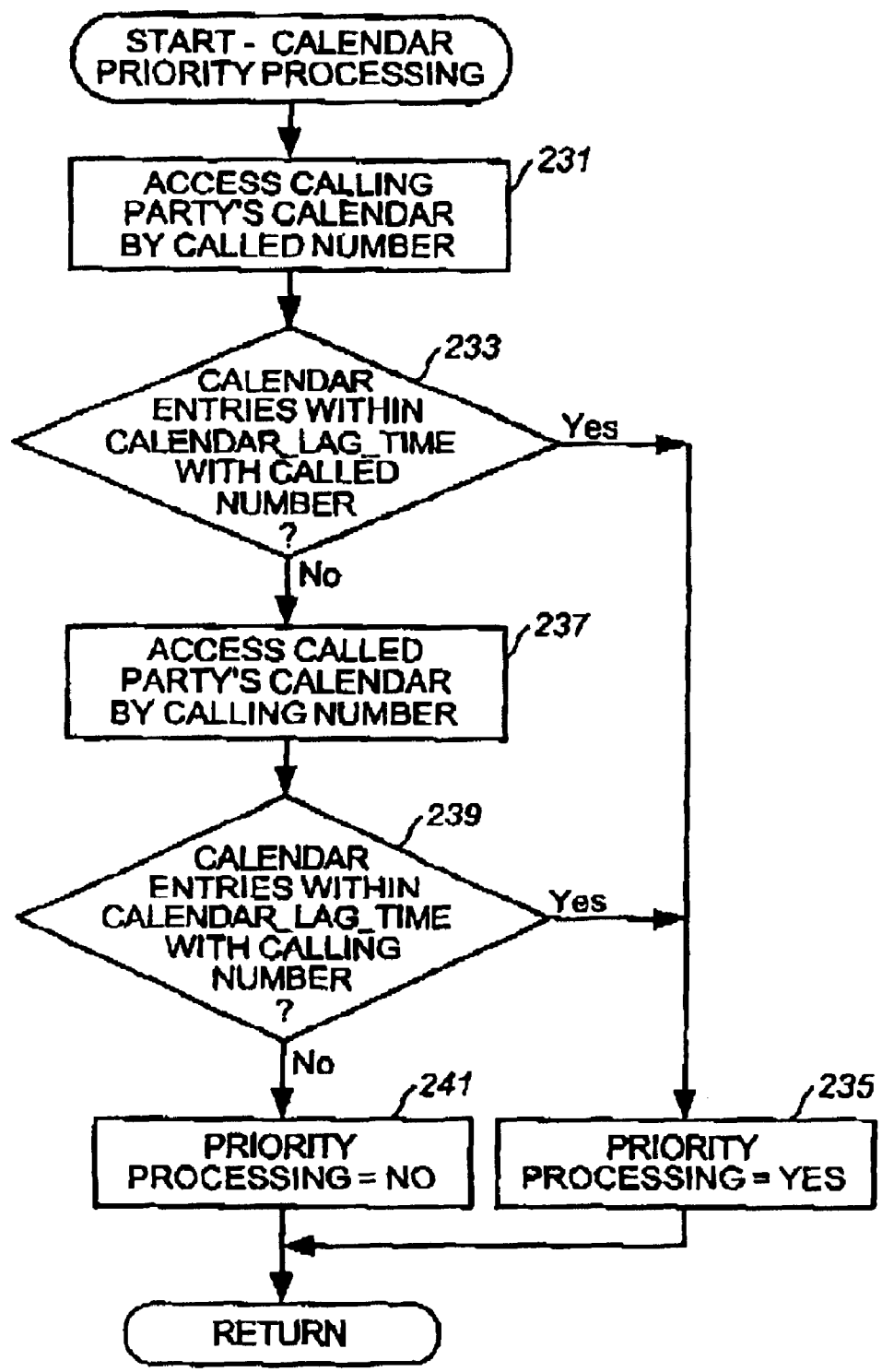
FIG. 8 is a flowchart of calendar priority processing according to the present invention.

Referring to FIG. 8, the system accesses the calling party's electronic calendar by the called party's telephone number or extension, at block 231. Then, the system tests, at decision block 233, if there are any calendar entries within the calendar lag time that include the called number. If so, the system sets priority processing to YES, at block 235, and returns to FIG. 4A. If, at decision block 233, there are no calendar entries within the calendar lag time that include the called number, then the system accesses the called party's calendar by calling party number, at block 237. Then the system tests, at decision block 239, if there are any calendar entries within the calendar lag time that include the calling number. If so, the system sets priority processing to YES, at block 235 and returns to FIG. 4A. If not, the system sets priority processing to NO, at block 241 and returns to FIG. 4A.

Referring again to FIG. 4A, the system tests, at decision block 243, if priority processing is set to YES. If so, processing continues to FIG. 4B. If not, the system performs other call handling at block 245 and FIG. 4 processing ends.

Referring now to FIG. 4B, during priority call processing, the system tests, at decision block 247, if the called number is off hook or busy. If so, the system provides priority tones, at block 249, and performs call waiting functionality, at block 251. Again, priority tones comprise a signal or announcement to the called party that a priority call is waiting. The system performs call waiting functionality so that the called party can answer the priority call.

If, at decision block 247, the called number is on hook, the system tests, at decision block 253, if the called number is forwarded. If so, the system overrides call forwarding by ringing the called number as though the number were not forwarded, at block 255. Typically, a user invokes call forwarding either to avoid receiving non-priority calls or to receive calls at another location. Since it is not known what motivated the called party to invoke call forwarding, the system rings the called number only a specified limited number of times. If, at decision block 257, the phone does not go off hook within the specified number of rings, the system forwards the call as indicated, at block 259. If the called party answers the call within the specified number of rings, the call proceeds normally, as indicated at block 261.

Referring back to decision block 253, if the called number is not forwarded, then the system performs normal ringing and subsequent processing, as indicated at block 263.

From the foregoing, it may be seen that the present invention is well adapted to overcome the shortcomings of the prior art. The present invention provides greater flexibility in allowing a user to receive priority calls while using features, such as voice mail and call forwarding, to avoid answering non-priority calls, and while he or she is on a call to another party. The present invention is applicable to both circuit switched telephone systems and packet switched telephone systems.

What is claimed is:

1. A method of processing a call between a calling number and a called number, which comprises the steps of:

determining if said called number is associated with a mask entry that matches said calling number;

if said called number is associated with the mask entry, providing special processing of said call based upon said matching mask entry; and if said called number is not associated with the mask entry, processing said call based upon status of an electronic mail, according to a call priority setting, wherein, status of the electronic mail includes existence of an electronic mail item in a priority repository of said called party.

2. The method as claimed in claim 1, wherein said mask entry is specified by digits.

3. The method as claimed in claim 1, wherein said mask entry is specified by digits and at least one wild card character.

4. The method as claimed in claim 3, wherein said wild card character specifies a single digit position in a calling number.

5. The method as claimed in claim 3, wherein said wild card character specifies a group of digits in a calling number.

6. The method as claimed in claim 1, wherein said mask entry includes a disposition code, and said step of providing special processing includes the step of processing said call based upon said disposition code.

7. The method as claimed in claim 1, wherein said electronic mail item includes a priority electronic mail item.

8. The method as claimed in claim 7, wherein said priority electronic mail item is a confirm on delivery mail item from said called party to said calling party.

9. The method as claimed in claim 7, wherein said priority electronic mail item is a confirm on delivery mail item from said called party to said calling party delivered within a set time period prior to receipt of said request to set up said call.

10. The method as claimed in claim 9, wherein said time period is set by said called party.

11. The method as claimed in claim 7, wherein said priority electronic mail item is an unanswered confirm on delivery electronic mail item from said called party to said calling party.

12. The method as claimed in claim 1, wherein said step of processing of said call based upon said status includes the step of:

waiting said call if said called patty telephone device is busy.

13. The method as claimed in claim 12, including the step of:

providing a special notification to said called party that a priority call is waiting.

14. The method as claimed in claim 1, wherein said step of providing special processing includes the step of:

overriding call forwarding.

15. The method as claimed in claim 14, wherein said step of overriding call forwarding includes the step of:

ringing the number of said called party if said called number is forwarded to a second number.

16. The method as claimed in claim 15, including the step of:

forwarding said call to said second number if the telephone device associated with said called party number is not answered within a selected number of rings.

17. The method as claimed in claim 15, wherein said ringing step includes the step of:

providing a special priority ringing tone.

18. A system for processing a call between a calling number and a called number, said system configured to perform the method as claimed in claim 1.

19. The method as claimed in claim 1, further comprising:

selectively processing said call based upon status of voice mail according to the call priority setting associated with the voice mail.

20. The method as claimed in claim 19, wherein said voice mail status include the existence of a voice mail message from said called party to said calling party.

* * * * *